United States Patent
Yun

(10) Patent No.: US 7,023,494 B2
(45) Date of Patent: Apr. 4, 2006

(54) IMAGE SIGNAL RECOVERING APPARATUS FOR CONVERTING COMPOSITE SIGNAL AND COMPONENT SIGNAL OF MAIN PICTURE AND SUB PICTURE INTO DIGITAL SIGNALS

(75) Inventor: Kyong-Il Yun, Suwon (KR)

(73) Assignee: Samsung Electronics Co., Ltd., Gyunggi-do (KR)

( * ) Notice: Subject to any disclaimer, the term of this patent is extended or adjusted under 35 U.S.C. 154(b) by 482 days.

(21) Appl. No.: 10/320,505

(22) Filed: Dec. 17, 2002

(65) Prior Publication Data

US 2003/0132986 A1 Jul. 17, 2003

(30) Foreign Application Priority Data

Jan. 15, 2002 (KR) .......................... 2002-0002364

(51) Int. Cl.
*H04N 5/268* (2006.01)
*H04N 5/45* (2006.01)
*H04N 9/74* (2006.01)

(52) U.S. Cl. .................. 348/572; 348/705; 348/565; 348/588

(58) Field of Classification Search .............. 348/705, 348/706, 572, 573, 708, 563, 564, 565, 584, 348/588, 598, 599, 725, 728; 386/34; 341/126, 341/155; H04N 5/445, 5/45, 9/74, 9/76, H04N 5/268, 9/64

See application file for complete search history.

(56) References Cited

U.S. PATENT DOCUMENTS 5,982,453 A * 11/1999 Willis .......................... 348/565
5,999,227 A * 12/1999 Doherty et al. ............. 348/564

FOREIGN PATENT DOCUMENTS

| JP | 06-046453 | 2/1994 |
| JP | 08-307885 | 11/1996 |
| JP | 09-247667 | 9/1997 |
| JP | 10-056651 | 4/1998 |
| JP | 11-027697 | 1/1999 |
| JP | 11-331864 | 11/1999 |
| JP | 2000-059702 | 2/2000 |

* cited by examiner

*Primary Examiner*—Sherrie Hsia
(74) *Attorney, Agent, or Firm*—Sughrue Mion, PLLC

(57) ABSTRACT

An image signal recovering apparatus for converting a composite signal and a component signal of a main picture and a sub picture into digital signals, including: a composite selecting unit which selectively outputs at least one of a plurality of composite signals inputted through first input ports of the composite selecting unit; a component selecting unit which selectively outputs at least one of a plurality of component signals inputted through second input ports of the composite selecting unit; a first converting unit for converting composite signals from the composite selecting unit into digital signals; a second converting unit for converting component signals from the component selecting unit into digital signals; and an input switching unit positioned between the component selecting unit and the second converting unit, for selectively switching composite signals from the composite selecting unit and component signals from the component selecting unit into the second converting unit.

11 Claims, 4 Drawing Sheets

IMAGE SIGNAL RECOVERING APPARATUS FOR CONVERTING COMPOSITE SIGNAL AND COMPONENT SIGNAL OF MAIN PICTURE AND SUB PICTURE INTO DIGITAL SIGNALS

BACKGROUND OF THE INVENTION

1. Field of the Invention

The present invention relates to an image display apparatus, and more particularly, to an image display apparatus for converting different kinds of analog image data received through one input unit into digital image signals through a plurality of analog to digital converters. The present application is based on Korean Patent Application No. 2002-2364, which is incorporated herein by reference.

2. Description of the Prior Art

A television will now be exemplified as an image display apparatus. In general, a television for decoding different kinds of image data has a picture in picture (PIP) function for displaying a main picture and a sub picture on one screen, or a double window function for displaying two images on one screen. The television receives a composite image signal and a component image signal through at least one decoder. Here, the decoder includes a plurality of analog to digital converters (ADC) for converting the composite image signal and the component image signal into digital signals.

FIG. 1 is a schematic block diagram illustrating the conventional television for reproducing different kinds of image signals. The conventional television includes: a decoder 11, a reproducing unit 13, a display unit 15 and a screen 17. The decoder 11 converts a composite signal, i.e., video burst synchronization (CVBS) signal, and a component signal, i.e., a luminance signal Y/chrominance signal C (Y/C) into digital signals. In addition, the decoder 11 designates a synchronization point for converting the digital CVBS, Y/C and RGB signals into original signals. The reproducing unit 13 recovers the original signals through the designated synchronization point of the CVBS, Y/C and RGB signals from the decoder 11, and optimizes the recovered CVBS, Y/C and RGB signals in a size displayed on the screen 17. The display unit 15 displays the CVBS, Y/C and RGB signals on the screen 17 in a size region having a size set up to display the CVBS, Y/C and RGB signals on the screen 17.

In general, the decoder 11 includes two switching units (not shown) for receiving the composite signal and the component signal, and switching and outputting the resultant signals, respectively. Here, the switching units receive different kinds of image signals. The switching unit for switching the composite signal and the component signal is connected to two ADCs (not shown), and the switching unit for switching the component signal is connected to four ADCs (not shown). Accordingly, the CVBS and the component signal, i.e., Y/C signals are converted into digital signals through the two ADCs, and the component signals other than Y/C, i.e., the RGB signals and a fast blanking (FB) signal inputted through a Scart jack of a European type television are converted into digital signals through the four ADCs.

When three signals including the CVBS and Y/C signals are inputted to the switching unit connected to the two ADCs, the switching unit converts the Y/C signals into one CVBS signal. Therefore, the switching unit transmits the two CVBS signals to the two ADCs, respectively, and the ADCs convert the CVBS signals into digital signals. However, when the Y/C signals are converted into one CVBS signal, image quality is reduced. Accordingly, when at least one input signal is the Y/C signal, the conventional television must convert the Y/C signal into one CVBS signal in order to convert the Y/C signal into a digital signal through the two ADCs. Moreover, since the Y/C signals are converted into one CVBS signal, the image quality of the signal is deteriorated.

Also, when a number of the ADCs for converting the two types of Y/C into a digital signal is increased to four, the cost of the product is increased.

SUMMARY OF THE INVENTION

Accordingly, it is a primary object of the present invention to provide a television which can prevent deterioration of image quality in reproduction, regardless of kinds of image signals.

Another object of the present invention is to provide a television which can maintain a predetermined format of the general ADC and convert inputted image signals into a digital format, regardless of the kinds of inputted image signals.

Still another object of the present invention is to provide a television which can prevent the prime cost from being increased due to necessity of four ADCs when two kinds of Y/C signals are inputted.

In order to accomplish the above objects, an image signal recovery apparatus according to the present invention includes: a first selecting unit for selectively outputting at least one of a composite signal, a chroma signal and a brightness signal being inputted to a first input port; a second selecting unit for selectively outputting a component signal, said component signal being inputted to a second input port; a first converting unit for converting said composite signal and said chroma signal outputted from said first selecting unit into a digital signal; a second converting unit for converting said component signal outputted from said second selecting unit and said chroma signal outputted from said first selecting unit into a digital signal; and an input switching unit provided in between said second selecting unit and said second converting unit, for selectively switching said chroma signal outputted from said first selecting unit and said component signal outputted from said second selecting unit to said second converting unit.

Among said composite signal, said brightness signal and said chroma signal are received to said first input port, said first selecting unit outputs said composite signal and said brightness signal to said first converting unit, and switches chroma signal to said input switching unit, and said input switching unit, when said chroma signal is received from said first selecting unit, switches said chroma signal to said second converting unit.

Said composite signal is a CVBS. Said component signal comprises at least one of said brightness signal and said chroma signal; an RGB/FB signal inputted through a Scart jack, a Y/Pb/Pr and Y/Cb/Cr signal as an HDTV and DVD signal; and an RGB/H/V signal outputted from a computer, and said second selecting unit, when said RGB signal is inputted through said second input port, segments said RGB signal and outputs said segments of said RGB signal to said second converting unit.

Said first converting unit comprises a first analog-to-digital converter (ADC) and a second analog-to-digital converter (ADC). Said second converting unit comprises third, fourth, fifth and sixth ADCs for converting said RGB/FB, said Y/Pb/Pr and said Y/Cb/Cr, and said RGB/H/V inputted to said second selecting unit, into a digital signal. Said third ADC converts R, Pr and Cr signals into a digital signal. Said fourth ADC converts G and Y signals into a digital signal. Said fifth ADC converts B, Pb and Cb signals into a digital signal, and said sixth ADC converts FB signal into a digital signal.

Said input switching unit includes first and second input switching units. Said first input switching unit is provided in between said second selecting unit and said third ADC, for switching said chroma signal outputted from said first selecting unit to said third ADC. Said second input switching unit is provided in between said second selecting unit and said fifth ADC, for switching said chroma signal outputted from said first selecting unit to said fifth ADC.

The image recovering apparatus according to the present invention further includes a synchronization designating unit, an input channel selecting unit, a main signal processing unit and a sub signal processing unit.

Said synchronization designating unit designates a clamping so as to cause said first converting unit and said second converting unit to convert said composite signal, said brightness signal, said chroma signal and said component signal into a digital signal, and provides said first converting unit and said second converting unit with said designated clamping.

Said input channel selecting unit segments said composite signal, said brightness signal, said chroma signal and said component signal digitalized by said first converting unit and said second converting unit, into a main signal for a main screen and a sub signal for a sub-screen. Said main signal processing unit signal-processes said composite signal, said brightness signal, said chroma signal and said component signal which are segmented at said input channel selecting unit for said main screen, for a picture quality improvement. Said sub signal processing unit signal-processes said composite signal, said brightness signal, said chroma signal, and said component signal of said sub signal which are segmented at said input channel selecting unit for said sub-screen, for a picture quality improvement.

Signal-processing of said main signal processing unit and said sub signal processing unit comprises at least one of noise reduction, a motion detection, a scaling and a filtering with respect to said composite signal, said brightness signal, said chroma signal and said component signal.

In accordance with the present invention, the image signal recovering apparatus converts the inputted image signals into digital signals through the respective ADCs, regardless of the kinds of the image signals, thereby maintaining an identical number of ADCs as in the conventional art, preventing deterioration of the image quality of the image signals, and reproducing the signals with the optimal image quality. In addition, the switching unit performs a switching operation so that the inputted image signals can be converted from an analog format to a digital format through the identical number of ADCs as in the conventional art, which results in reduction of the prime cost of the product.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

An image signal recovering apparatus in accordance with a preferred embodiment of the present invention will now be described in detail with reference to the accompanying drawings.

Figure 1:
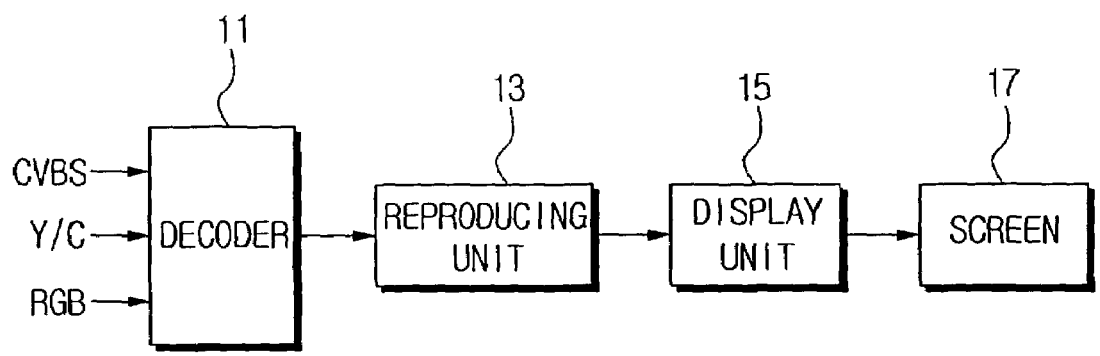
FIG. 1 is a schematic block diagram illustrating a conventional television for reproducing different kinds of image signals.
Figure 2:
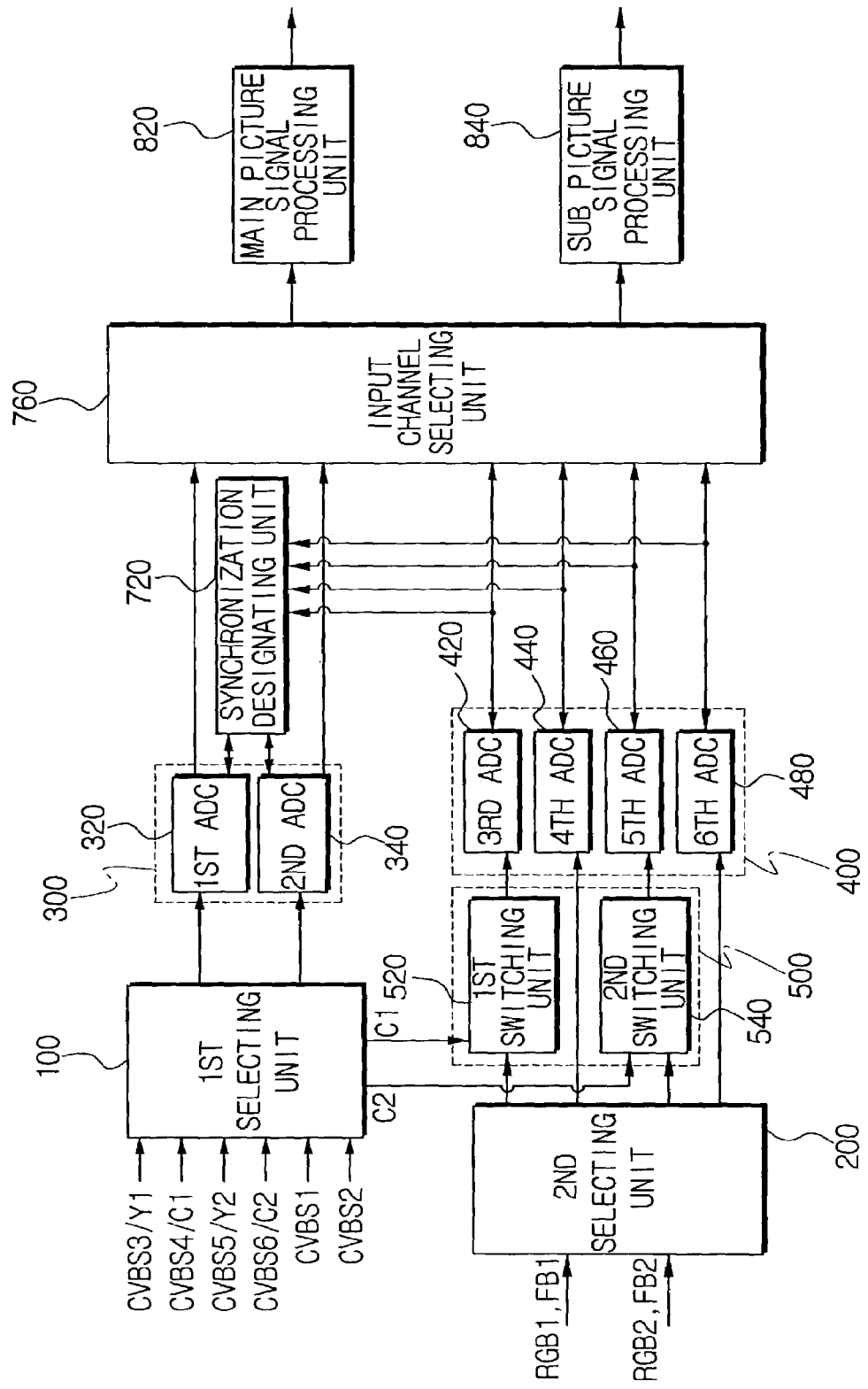
FIG. 2 is a block diagram illustrating an image signal recovering apparatus for a television in accordance with a preferred embodiment of the present invention.

FIG. 2 is a block diagram illustrating the image signal recovering apparatus for a television in accordance with the preferred embodiment of the present invention. Referring to FIG. 2, the image signal recovering apparatus includes: a first selecting unit 100 having a plurality of input ports; a second selecting unit 200 having a plurality of input ports; a first converting unit 300, a second converting unit 400, an input switching unit 500 and an input channel selecting unit 760. In accordance with the present invention, the image signal recovering apparatus has a picture in picture (PIP) function for displaying a main picture and a sub picture on one screen (not shown), and a picture out picture (POP) function, or a double window function, for displaying two images on the same ratio size regions of one screen.

The image signals inputted through the input ports of the first selecting unit 100 are composite signals and luminance signals and chrominance signals. The composite signals include a composite video burst synchronization (CVBS) signal. Accordingly, when the image signal recovering apparatus performs the PIP function, the POP function or the double window function, the signals which can be inputted to the first selecting unit 100 are, among the component signals, a luminance signal Y and a chrominance signal C. There are luminance signal Y1, chrominance signal C1 and a composite video burst synchronization signal CVBS1 as a main picture. Preferably, when the luminance signals Y1 and Y2 and the composite video burst synchronization signals CVBS1 and CVBS2 are inputted through the input ports, the first selecting unit 100 switches the luminance signals Y1 and Y2 and the composite video burst synchronization signals CVBS1 and CVBS2 into the first converting unit 300. In addition, when the chrominance signals C1 and C2 are inputted through the input ports, the first selecting unit 100 switches the chrominance signals C1 and C2 into the input switching unit 500.

The image signals inputted through the input ports of the second selecting unit 200 are component signals exclusive of Y/C. The component signals are RGB/FB signals inputted through a Scart jack of a European type television, Y/Pb/Pr and Y/Cb/Cr signals which are HDTV and DVD signals, and RGB/H/V signals outputted from a computer. Therefore, the second selecting unit 200 selectively switches the component signals inputted through the input ports into the second converting unit 400. Preferably, when the RGB1/FB1 signals are inputted through the input port, the second selecting unit 200 divides the RGB1 signal, and switches the divided signals R1, G1 and B1 and the FB1 signal into the second converting unit 400.

The first converting unit 300 includes a first ADC 320 and a second ADC 340. The first ADC 320 converts the composite signal and the chrominance signal of the main picture outputted from the first selecting unit 100 into a digital signal. The second ADC 340 converts the composite signal and the chrominance signal of the sub picture outputted from the first selecting unit 100 into a digital signal. Preferably, the first ADC 320 converts the luminance signal Y1 of the main picture and the composite video burst synchronization signal CVBS1 of the main picture into digital signals, and the second ADC 340 converts the luminance signal Y2 of the sub picture and the composite video burst synchronization signal CVBS1 of the sub picture into digital signals.

The second converting unit 400 includes a third ADC 420, a fourth ADC 440, a fifth ADC 460 and a sixth ADC 480. Preferably, the third ADC 420 converts R, Pr and Cr signals from the second selecting unit 200 into digital signals, the fourth ADC 440 converts G and Y signals from the second selecting unit 200 into digital signals, the fifth ADC 460 converts B, Pb and Cb signals from the second selecting unit 200 into digital signals, and the sixth ADC 480 converts FB signals from the second selecting unit 200 into digital signals.

The input switching unit 500 is positioned between the second selecting unit 200 and the second converting unit 400. Preferably, the input switching unit 500 selectively switches the chrominance signals C1 and C2 from the first selecting unit 100 and the component signal from the second selecting unit 200 into the second converting unit 400. Here, the input switching unit 500 includes a first switching unit 520 and a second switching unit 540. The first switching unit 520 switches the chrominance signal C1 of the main picture of the chrominance signals C1 and C2 outputted from the first selecting unit 100 into the third ADC 420. Accordingly, the third ADC 420 converts the chrominance signal C1 of the main picture from the first switching unit 520 into a digital signal. In addition, the second switching unit 540 switches the chrominance signal C2 of the sub picture of the chrominance signals C1 and C2 outputted from the first selecting unit 100 into the fifth ADC 460. Therefore, the fifth ADC 460 converts the chrominance signal C2 of the sub picture from the second switching unit 540 into a digital signal.

The input channel selecting unit 760 divides the composite signals, the luminance signal, the chrominance signal and the component signals outputted from the ADCs 320, 340, 420, 440, 460 and 480 into the main picture and the sub picture, and outputs the main picture signals and the sub picture signals, respectively.

In this embodiment, the image signal recovering apparatus includes a synchronization designating unit 720 for designating clamping for converting the composite signals, the luminance signals, the chrominance signals and the component signals into digital signals in the first converting unit 300 and the second converting unit 400, and providing the designated clamping to the first converting unit 300 and the second converting unit 400.

In addition, the image signal recovering apparatus includes a main picture signal processing unit 820 and a sub picture signal processing unit 840 for respectively processing the main picture signals and the sub picture signals outputted from the input channel selecting unit 760. The main picture signal processing unit 820 performs noise reduction, motion detection, scaling and filtering on the main picture processing image signal from the input channel selecting unit 760. The sub picture signal processing unit 840 receives the sub picture processing image signal from the input channel selecting unit 760, and performs noise reduction, motion detection, scaling and filtering thereon.

When the main picture of the composite signal inputted through the input port of the first selecting unit 100 is the luminance signal Y1/chrominance signal C1 and the sub picture thereof is the luminance signal Y2/chrominance signal C2, the first selecting unit 100 outputs the luminance signal Y1 of the main picture to the first ADC 320, and the luminance signal Y2 of the sub picture to the second ADC 340. Here, the first selecting unit 100 outputs the chrominance signal C1 of the main picture to the first switching unit 520, and the chrominance signal C2 of the sub picture to the second switching unit 540. Accordingly, the first switching unit 520 switches the chrominance signal C1 of the main picture into the third ADC 420, and the second switching unit 540 switches the chrominance signal C2 of the sub picture into the fifth ADC 460.

As a result, the first ADC 320 provides a synchronous signal included in the luminance signal Y1 of the main picture to the synchronization designating unit 720. The synchronization designating unit 720 designates clamping according to the synchronous signal from the first ADC 320, and provides the clamping to the first ADC 320. The first ADC 320 converts the luminance signal Y1 of the main picture into a digital signal according to the clamping designated by the synchronization designating unit 720, and outputs the converted signal to the input channel selecting unit 760. The second ADC 340 provides a synchronous signal included in the luminance signal Y2 of the sub picture to the synchronization designating unit 720, converts the luminance signal Y2 of the sub picture into a digital signal according to the clamping designated by the synchronization designating unit 720, and outputs the converted signal to the input channel selecting unit 760. The third ADC 420 provides a synchronous signal included in the chrominance signal C1 of the main picture to the synchronization designating unit 720, converts the chrominance signal C1 of the main picture into a digital signal according to the clamping designated by the synchronization designating unit 720, and outputs the converted signal to the input channel selecting unit 760. The fifth ADC 460 provides a synchronous signal included in the chrominance signal C2 of the sub picture to the synchronization designating unit 720, converts the chrominance signal C2 of the sub picture into a digital signal according to the clamping designated by the synchronization designating unit 720, and outputs the converted signal to the input channel selecting unit 760. The input channel selecting unit 760 divides the luminance signals Y1 and Y2 and chrominance signals C1 and C2 which are converted into the digital signals in the first ADC 320, the second ADC 340, the third ADC 420 and the fifth ADC 460 into the luminance signal Y1 and the chrominance signal C1 of the main picture and the luminance signal Y2 and the chrominance signal C2 of the sub picture. Accordingly, the input channel selecting unit 760 outputs the luminance signal Y1 and the chrominance signal C1 of the main picture to the main picture signal processing unit 820, and also outputs the luminance signal Y2 and the chrominance signal C2 of the sub picture to the sub picture signal processing unit 840.

Therefore, the main picture signal processing unit 820 processes the luminance signal Y1/chrominance signal C1 of the main picture in order to improve image quality. The sub picture signal processing unit 840 processes the luminance signal Y2/chrominance signal C2 of the sub picture in order to improve image quality.

On the other hand, when the composite signal having the composite video burst synchronization signal CVBS1 as the main picture and the composite video burst synchronization signal CVBS2 as the sub picture is inputted to the first selecting unit 100, the first selecting unit 100 outputs the composite video burst synchronization signal CVBS1 to the first ADC 320, and the composite video burst synchronization signal CVBS2 to the second ADC 340. Thus, the first ADC 320 provides a synchronous signal included in the composite video burst synchronization signal CVBS1 to the synchronization designating unit 720, converts the composite video burst synchronization signal CVBS1 into a digital signal according to the clamping designated by the synchronization designating unit 720, and outputs the converted signal to the input channel selecting unit 760. The second ADC 340 provides a synchronous signal included in the composite video burst synchronization signal CVBS2 to the synchronization designating unit 720, converts the composite video burst synchronization signal CVBS2 into a digital signal according to the clamping designated by the synchronization designating unit 720, and outputs the converted signal to the input channel selecting unit 760.

When the signal having the composite video burst synchronization signal CVBS1 as the main picture and the luminance signal Y2/chrominance signal C2 as the sub picture is inputted to the first selecting unit 100, the first selecting unit 100 outputs the composite video burst synchronization signal CVBS1 of the main picture to the first ADC 320, and the luminance signal Y2 of the sub picture to the second ADC 340. In addition, the first selecting unit 100 outputs the chrominance signal C2 of the sub picture to the second switching unit 540. The second switching unit 540 switches the chrominance signal C2 of the sub picture into the fifth ADC 460.

When the signal having the luminance signal Y1/chrominance signal C1 as the main picture and the composite video burst synchronization signal CVBS2 as the sub picture is inputted to the first selecting unit 100, the first selecting unit 100 outputs the luminance signal Y1 of the main picture to the first ADC 320, and the composite video burst synchronization signal CVBS2 to the second ADC 340. Here, the first selecting unit 100 outputs the chrominance signal C1 of the main picture to the first switching unit 520. The first switching unit 520 switches the chrominance signal C1 of the sub picture into the third ADC 420.

Accordingly, the image signal recovering apparatus does not determine a number of the ADCs according to a kind and number of the inputted composite signals, the luminance signals and the chrominance signals, but converts the respective image signals into digital signals through the first ADC 320, the second ADC 340, the third ADC 420 and/or the fifth ADC 460. In addition, when the luminance signal Y/chrominance signal C is inputted to the first selecting unit 100, the first selecting unit 100 does not convert the divided Y and C signals into one CVBS signal, but respectively converts the Y and C signals into digital signals, thereby preventing deterioration of image quality in reproduction and display of the image signals.

Figure 3A:
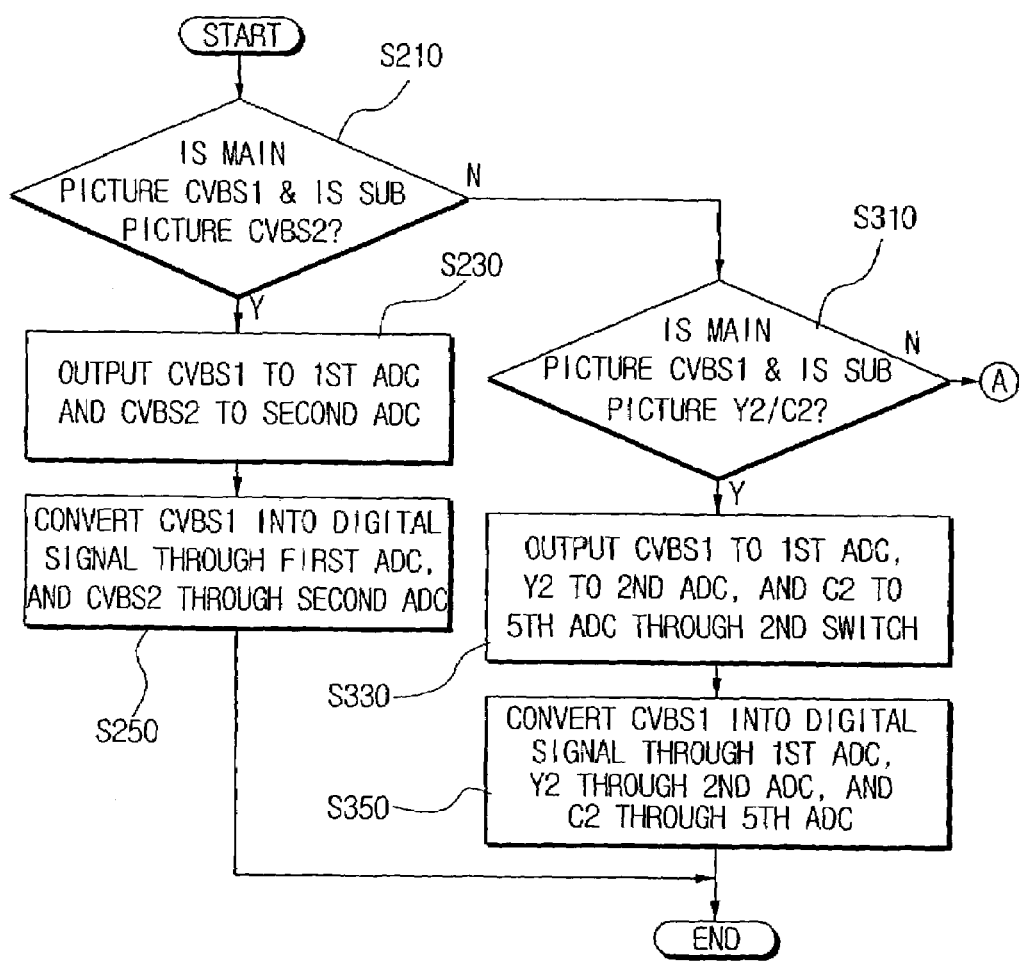
FIGS. 3A and 3B are flowcharts showing a method for recovering an image signal by using the image signal recovering apparatus for the television in accordance with the present invention.
Figure 3B:
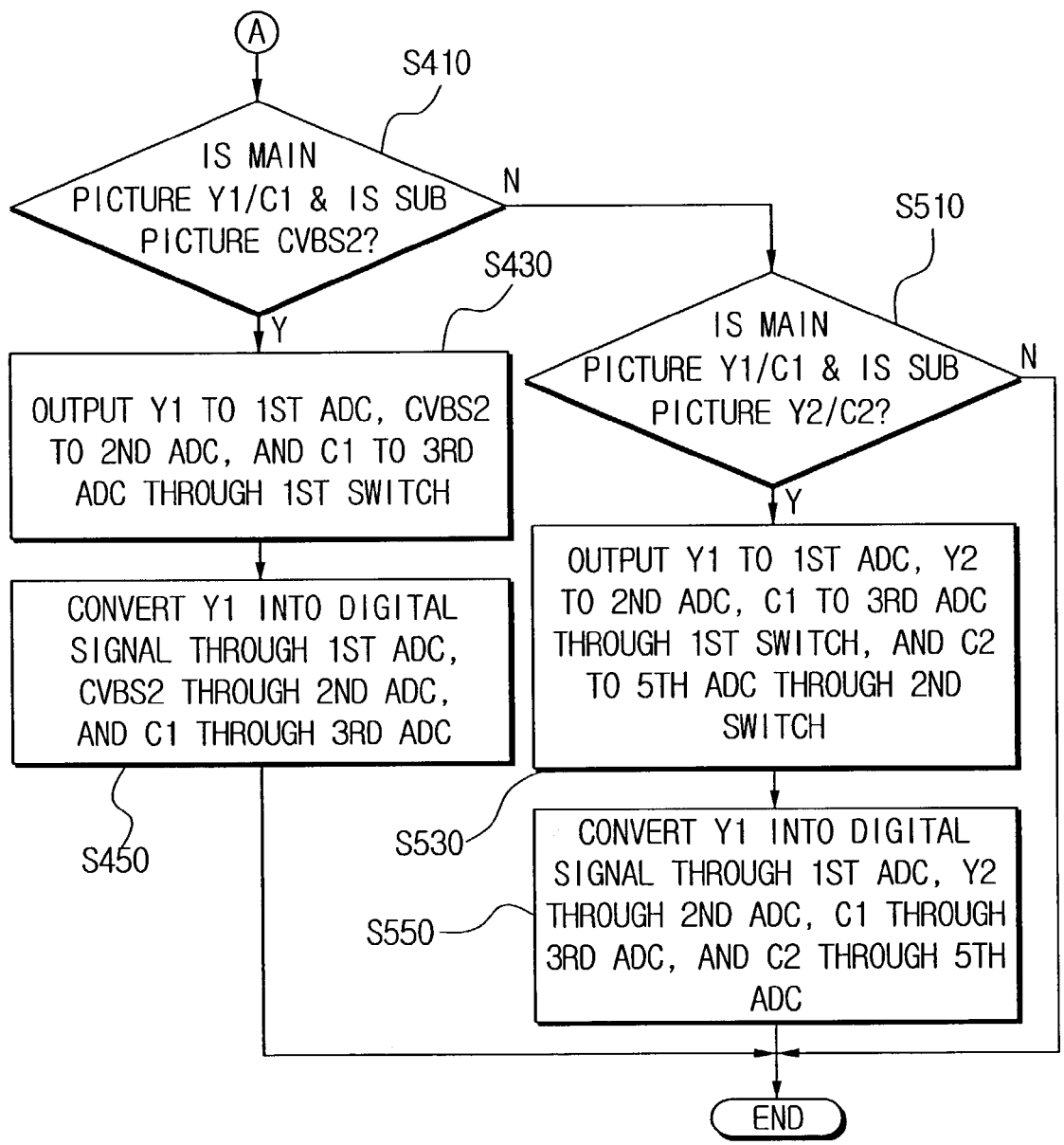

FIGS. 3A and 3B are flowcharts showing a method for recovering the image signal by using the image signal recovering apparatus in accordance with the present invention. Here, the main signal is the composite video burst synchronization signal CVBS1 and the sub signal is the composite video burst synchronization signal CVBS2 among the CVBS signals inputted through the input ports. When one among the composite signal, the luminance signal and the chrominance signal is inputted to the first selecting unit 100 through the input port, the first selecting unit 100 divides the composite signal into the main picture and the sub picture.

Thereafter, the first selecting unit 100 confirms whether the main picture is the CVBS1 signal and the sub picture is the CVBS2 signal (S210). When the main picture of the inputted composite signal is the CVBS1 signal and the sub picture thereof is the CVBS2 signal, the first selecting unit 100 outputs the CVBS1 signal to the first ADC 320, and the CVBS2 signal to the second ADC 340 (S230). Accordingly, the first ADC 320 provides a synchronous signal included in the CVBS1 signal to the synchronization designating unit 720, and converts the CVBS1 signal into a digital signal according to the clamping designated by the synchronization designating unit 720 (S250). In addition, the second ADC 340 provides a synchronous signal included in the CVBS2 signal to the synchronization designating unit 720, and converts the CVBS2 signal into a digital signal according to the clamping designated by the synchronization designating unit 720.

In the above step S210, when the main picture of the composite signal is not the CVBS1 signal and the sub picture thereof is not the CVBS2 signal, the first selecting unit 100 judges whether the main picture of the input signal is the CVBS1 signal and the sub picture thereof is the luminance signal Y2/chrominance signal C2 (S310). When the main picture of the input signal is the CVBS1 signal and the sub picture thereof is the luminance signal Y2/chrominance signal C2, the first selecting unit 100 outputs the CVBS1 signal to the first ADC 320, and the luminance signal Y2 of the sub picture to the second ADC 340 (S330). Here, the first selecting unit 100 outputs the chrominance signal C2 of the sub picture to the second switching unit 540. The second switching unit 540 outputs the chrominance signal C2 of the sub picture to the fifth ADC 460. Therefore, the first ADC 320 provides a synchronous signal included in the CVBS1 signal to the synchronization designating unit 720, and converts the CVBS1 signal into a digital signal according to the clamping designated by the synchronization designating unit 720. The second ADC 340 provides a synchronous signal included in the luminance signal Y2 of the sub picture to the synchronization designating unit 720, and converts the luminance signal Y2 of the sub picture into a digital signal according to the clamping designated by the synchronization designating unit 720 (S350). Here, the fifth ADC 460 receiving the chrominance signal C2 of the sub picture from the second switching unit 540 provides a synchronous signal included in the chrominance signal C2 of the sub picture to the synchronization designating unit 720, and converts the chrominance signal C2 of the sub picture into a digital signal according to the clamping designated by the synchronization designating unit 720.

In the above step S310, when the main picture of the composite signal is not the CVBS1 signal and the sub picture thereof is not the luminance signal Y2/chrominance signal C2, as shown in FIG. 3B, the first selecting unit 100 judges whether the main picture of the composite signal is the luminance signal Y1/chrominance signal C1 and the sub picture thereof is the CVBS2 signal (S410). When the main picture of the composite signal is the luminance signal Y1/chrominance signal C1 and the sub picture thereof is the CVBS2 signal, the first selecting unit 100 outputs the luminance signal Y1 of the main picture to the first ADC 320, and the CVBS2 signal to the second ADC 340 (S430). Here, the first selecting unit 100 outputs the chrominance signal C1 of the main picture to the first switching unit 520. The first switching unit 520 outputs the chrominance signal C1 of the main picture to the third ADC 420. Therefore, the first ADC 320 provides a synchronous signal included in the luminance signal Y1 of the main picture to the synchronization designating unit 720, and converts the luminance signal Y1 of the main picture into a digital signal according to the clamping designated by the synchronization designating unit 720. The second ADC 340 provides a synchronous signal included in the CVBS2 signal to the synchronization designating unit 720, and converts the CVBS2 signal into a digital signal according to the clamping designated by the synchronization designating unit 720 (S450). In addition, the third ADC 420 provides a synchronous signal included in the chrominance signal C1 of the main picture to the synchronization designating unit 720, and converts the chrominance signal C1 of the main picture into a digital signal according to the clamping designated by the synchronization designating unit 720.

In the above step S410, when the main picture of the input signal is not the luminance signal Y1/chrominance signal C1 and the sub picture thereof is not the CVBS2 signal, the first selecting unit 100 confirms whether the main picture of the input signal is the luminance signal Y1/chrominance signal C1 and the sub picture thereof is the luminance signal Y2/chrominance signal C2 (S510). When the main picture of the input signal is the luminance signal Y1/chrominance signal C1 and the sub picture thereof is the luminance signal Y2/chrominance signal C2, the first selecting unit 100 outputs the luminance signal Y1 of the main picture to the first ADC 320, and the luminance signal Y2 of the sub picture to the second ADC 340 (S530). In addition, the first selecting unit 100 outputs the chrominance signal C1 of the main picture to the first switching unit 520, and the chrominance signal C2 of the sub picture to the second ADC 340. The first switching unit 520 switches the chrominance signal C1 of the main picture into the third ADC 420, and the second switching unit 540 switches the chrominance signal C2 of the sub picture into the fifth ADC 460.

Therefore, the first ADC 320 provides a synchronous signal included in the luminance signal Y1 of the main picture to the synchronization designating unit 720, and converts the luminance signal Y1 of the main picture into a digital signal according to the clamping designated by the synchronization designating unit 720. The second ADC 340 provides a synchronous signal included in the luminance signal Y2 of the sub picture to the synchronization designating unit 720, and converts the luminance signal Y2 of the sub picture into a digital signal according to the clamping designated by the synchronization designating unit 720 (S550). In addition, the third ADC 420 provides a synchronous signal included in the chrominance signal C1 of the main picture to the synchronization designating unit 720, and converts the chrominance signal C1 of the main picture into a digital signal according to the clamping designated by the synchronization designating unit 720. The fifth ADC 460 provides a synchronous signal included in the chrominance signal C2 of the sub picture to the synchronization designating unit 720, and converts the chrominance signal C2 of the sub picture into a digital signal according to the clamping designated by the synchronization designating unit 720.

Accordingly, when the signal inputted to the first selecting unit 100 includes the chrominance signals C1 and C2, the chrominance signals C1 and C2 are switched into the third ADC 420 and the fifth ADC 460 through the first switching unit 520 or the second switching unit 540, and converted into digital signals, thereby preventing image quality from being reduced in the reproduction and display of the image signals.

In this embodiment, the Y1/C1, Y2/C2 and CVBS1/CVBS2 signals are inputted to the first selecting unit 100. However, composite video burst synchronization signals CVBS3, CVBS4, CVBS5 and CVBS6 can also be inputted through the input ports receiving the Y1/C1 and Y2/C2 signals. The output operation of the first selecting unit 100 when the main picture signal and the sub picture signal are different was explained above. In the case that a control signal is inputted to display the main picture and the sub picture on one signal inputted through the input port, the first selecting unit 100 outputs the input signal.

On the other hand, the operation of the first selecting unit 100 receiving the main picture signal and the sub picture signal was explained above. When the main picture signal or sub picture signal is inputted to the first selecting unit 100 and the main picture signal or sub picture signal is inputted to the second selecting unit 200, the signal inputted to the first selecting unit 100 is converted into a digital signal in the first converting unit 300, and the signal inputted to the second selecting unit 200 is converted into a digital signal in the second converting unit 400.

In accordance with the present invention, the image signal recovering apparatus converts the inputted image signals into digital signals through the ADCs, regardless of the kinds of image signals, thereby preventing deterioration of the image quality in the reproduction of the image signals.

Moreover, in order to convert the image signals into digital signals by using an identical number of ADCs as in the conventional art, the third ADC and the fifth ADC are shared to cut down the prime cost of the product.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An image signal recovering apparatus, comprising:
   a first selecting unit for selectively outputting at least one of a composite signal, a chroma signal and a brightness signal, which are inputted to a first input port;
   a second selecting unit for selectively outputting a component signal, said component signal being inputted to a second input port;
   a first converting unit for converting said composite signal and said brightness signal outputted from said first selecting unit into a digital signal;
   a second converting unit for converting said component signal outputted from said second selecting unit and said chroma signal outputted from said first selecting unit into a digital signal; and
   an input switching unit provided in between said second selecting unit and said second converting unit, for selectively switching said chroma signal outputted from said first selecting unit and said component signal outputted from said second selecting unit to said second converting unit.

2. The image signal recovering apparatus of claim 1, wherein, among said composite signal, said brightness signal and said chroma signal received to said first input port, said first selecting unit outputs said composite signal and said brightness signal to said first converting unit, and switches said chroma signal to said input switching unit, and said input switching unit, when said chroma signal is received from said first selecting unit, switches said chroma signal to said second converting unit.

3. The image signal recovering apparatus of claim 2, wherein said composite signal is a composite video burst synchronization (CVBS) signal.

4. The image signal recovering apparatus of claim 1, wherein said component signal comprises at least one of:
- said brightness signal and said chroma signal;
- an RGB/FB signal inputted through a Scart jack;
- a Y/Pb/Pr and Y/Cb/Cr signal as an HDTV and DVD signal; and an
- RGB/H/V signal outputted from a computer, and
- said second selecting unit, when either said RGB/1~B signal or said RGB/H/V signal is inputted through said second input port, segments said RGB/FB signal or said RGB/H/V signal and outputs said segments of said RGB signal to said second converting unit.

5. The image signal recovering apparatus of claim 4, wherein said first converting unit comprises a first analog-to-digital converter (ADC) and a second analog-to-digital converter (ADC).

6. The image signal recovering apparatus of claim 5, wherein said second converting unit comprises no more than four analog-to-digital converters.

7. The image signal recovering apparatus of claim 6, wherein, with respect to said RGB/FB, said Y/Pb/Pr and said Y/Cb/Cr, and said RGB/IUV signals inputted to said second selecting unit,
said second converting unit comprises:
- a third ADC for converting R, Pr and Cr signals into a digital signal;
- a fourth ADC for converting G and Y signals into a digital signal;
- a fifth ADC for converting B, Pb and Cb signals into a digital signal; and
- a sixth ADC for converting FB signal into a digital signal.

8. The image signal recovering apparatus of claim 7, wherein said input switching unit comprises:
- a first input switching unit provided in between said second selecting unit and said third ADC, for switching said chroma signal outputted from said first selecting unit to said third ADC; and
- a second input switching unit provided in between said second selecting unit and said fifth ADC, for switching said chroma signal outputted from said first selecting unit to said fifth ADC.

9. The image signal recovering apparatus of claim 8 further comprising a synchronization designating unit for designating a clamping so as to cause said first converting unit and said second converting unit to convert said composite signal, said brightness signal, said chroma signal and said component signal into a digital signal, and provides said first converting unit and said second converting unit with said designated clamping.

10. The image signal recovering apparatus of claim 9, further comprising:
- an input channel selecting unit for segmenting said composite signal, said brightness signal, said chroma signal and said component signal digitalized by said first converting unit and said second converting unit, into a main signal for a main screen and a sub signal for a sub-screen;
- a main signal processing unit for signal-processing said composite signal, said brightness signal, said chroma signal and said component signal which are segmented at said input channel selecting unit for said main screen, for a picture quality improvement; and
- a sub signal processing unit for signal-processing said composite signal, said brightness signal, said chroma signal, and said component signal of said sub signal which are segmented at said input channel selecting unit for said sub-screen, for a picture quality improvement.

11. The image signal recovering apparatus of claim 10, wherein signal-processing of said main signal processing unit and said sub signal processing unit comprises at least one of noise reduction, a motion detection, a scaling and a filtering with respect to said composite signal, said brightness signal, said chroma signal and said component signal.

* * * * *